Dec. 18, 1962    E. F. ZOLTANSKI    3,069,553
LIGHT SOURCE FOR PHOTOELECTRIC INSPECTION OF GLASSWARE
Filed May 12, 1959
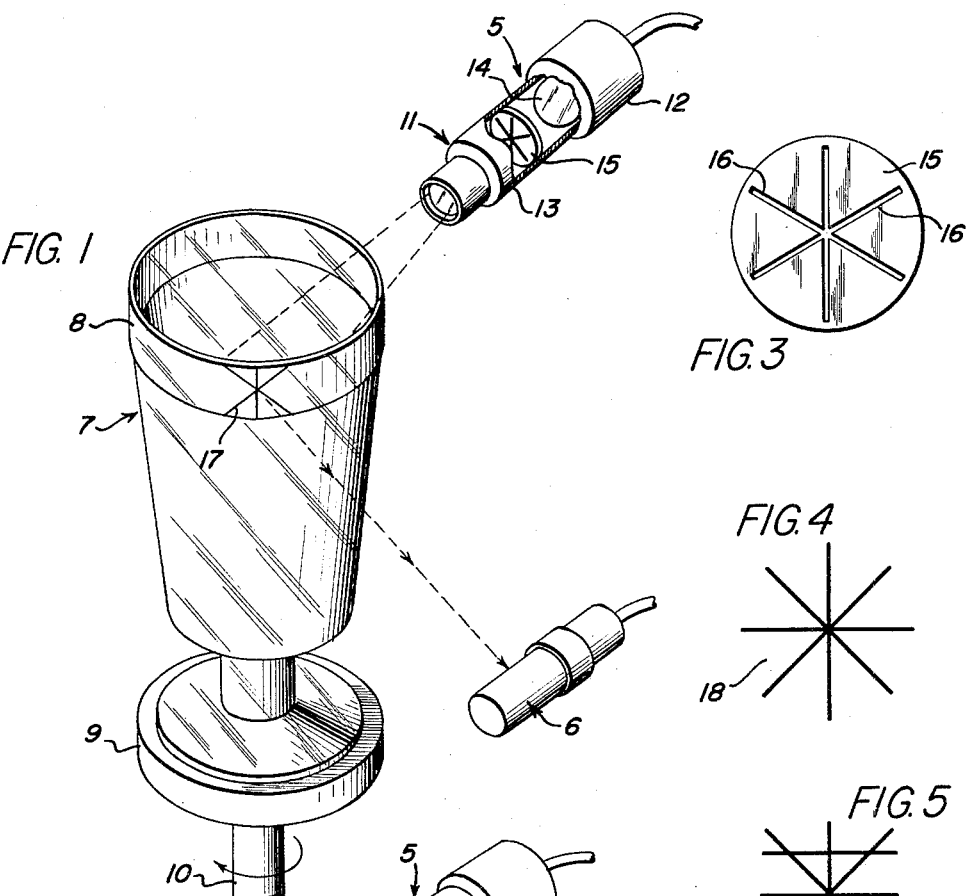
INVENTOR
EDWARD F. ZOLTANSKI

United States Patent Office 3,069,553
Patented Dec. 18, 1962

3,069,553
LIGHT SOURCE FOR PHOTOELECTRIC
INSPECTION OF GLASSWARE
Edward Francis Zoltanski, Toledo, Ohio, assignor to Continental Can Company, Inc., New York, N.Y., a corporation of New York
Filed May 12, 1959, Ser. No. 812,746
3 Claims. (Cl. 250—222)

The invention generally relates to the art of inspecting glassware through the use of photoelectric inspection apparatus, and primarily seeks to provide a novel light source for use in the photoelectric inspection of glassware.

In the inspection of glassware for defects, photoelectric inspection apparatus is conventionally used. A beam of light from a light source is directed on the glassware while the glassware is rotated, and when a defect in the glassware comes into the path of the light beam, the direct light of the light beam is scattered and reflected at various angles. A pickup head of a photoelectric cell unit is located in such a position that there is a large contrast between the light which normally strikes the pickup head and the light which is reflected to the pickup head when a defect is present. Initially, a circular beam of light was directed on the glassware. However, it was found that the circular beam of light did not effectively detect defects having small dimensions. When the matter is given consideration, it is readily apparent that a small defect will reflect only a small amount of light. When the beam of light directed onto the glassware is very great, it will be apparent that the light normally striking the pickup head is also relatively great, and there will be only a minor increase in the light striking the pickup head when the light is reflected by a minor defect. For the photoelectric inspection system to give a good response from defects which have small dimensions, it is necessary to have an intense light of small dimensions projected onto the glassware.

It is desired to pick up surface checks or cracks in glassware which may not be larger than 1/32" long x 1/32" deep. To pick up such defects, and those smaller in size, a narrow slit of light is used. Also, the maximum pickup response is obtained when the slit of light projected onto the glassware is aligned to coincide with the defect. Therefore, in order to obtain a larger response from a variety of orientations of defects in the glassware, a large number of light sources should be used. Because of the dimensions of the glassware under inspection, it is extremely difficult to increase the number of light sources to that required. Further, should the light sources be directed to various parts of the glassware under inspection, it will be necessary to provide either separate pickup heads for each light source, or a mirror for each light source which will direct the reflected light to the pickup head. The space limitations prevent the use of a plurality of pickup heads and the similar space limitations also prevent the use of an excessive number of mirrors. Furthermore, it is highly desirable that all elements of the photoelectric inspection system be disposed out of the path of the glassware so that the elements may remain fixed at all times and need not be shifted during the positioning of or removal of glassware with respect to the inspection zone.

It is therefore the object of this invention to provide a light source which is of such a nature that the desired beams of light may be readily directed onto the area of glassware to be inspected with the light source being of such a nature as to fit within the space requirements of the inspection system.

Another object of the invention is to provide a novel light source unit for use in the photoelectric inspection of glassware, the light source unit including a single light source and means for confining the light rays emitting from the light source to a multiple line pattern which will be the full equivalent of a plurality of individual light beams directed onto the glassware from a plurality of individual light sources.

Another object of the invention is to provide a novel light source unit for use in conjunction with a mechanism for the photoelectric inspection of glassware, the light source unit including a single light source and means for directing the rays of light from the light source onto the glassware in a multiple line pattern, the pattern being of such a nature that light rays deflected by defects in the glassware may be picked up by a single pickup head of a photoelectric cell unit.

Still another object of the invention is to provide a novel light source unit for use as part of a photoelectric inspection system, the light source unit including a single light source and a mask, the mask interrupting the beam of light from the light source and permitting the passage of light beams in the form of a multiple line pattern, the pattern being directable onto glassware in alignment with the pickup head of a photoelectric cell unit whereby light will be reflected by minor defects in the glassware to the pickup head.

A further object of the invention is to provide a novel apparatus for the photoelectric inspection of glassware, the apparatus including a light source unit and a pickup head of a photoelectric cell inspection unit, the light source and the pickup head being both fixed relative to the glassware and to each other, the light source being disposed in an out-of-the-way position above the glassware being inspected and directing a light beam downwardly thereonto, and the pickup head being disposed to one side of the glassware being inspected and receiving reflected light rays from defects in the glassware.

With the above, and other objects in view that will hereinafter appear, the nature of the invention will be more clearly understood by reference to the following detailed description, the appended claims, and the several views illustrated in the accompanying drawings:

In the drawings:

FIGURE 1 is a perspective view showing the general relation between the light source unit, an article of glassware being inspected, and a photoelectric cell unit pickup head, a portion of the housing of the light source unit being broken away to show the relative positions of the light source and mask carried by the housing.

FIGURE 2 is a diagrammatic view showing the angular relation between the axis of the light rays from the light source and the axis of the reflected rays to the pickup head with respect to each other and to the horizontal.

FIGURE 3 is an enlarged elevational view showing the details of the mask.

FIGURES 4, 5 and 6 are diagrammatic views showing other light patterns which may be directed from the light source unit.

In the embodiment of the invention illustrated in the drawings, the light source unit is generally referred to by the numeral 5, the pickup head is generally referred to by the numeral 6, and the article of glassware to be inspected is generally referred to by the numeral 7. The general relationship between these three components is best illustrated in FIGURE 1.

The article of glassware 7 is illustrated as being in the form of a sherbet glass, but may be of any design. For descriptive purposes, a rim portion 8 of the glassware 7 is to be inspected by a photoelectric inspection operation. The glassware 7 is seated on a turntable 9 which is supported by a rotating shaft 10. As the shaft 10 rotates, the turntable 9 rotates together with the glassware 7 to present different areas of the rim portion 8 for inspection.

The light source unit 5 includes a housing generally referred to by the numeral 11. The housing 11 includes an enlarged rear portion 12 and a barrel portion 13. A single light source 14 in the form of an electric blub is mounted in the rear portion 12. If desired, suitable lenses (not shown) may be mounted in the barrel portion 13. A mask 15 is mounted in the barrel portion 13 for intercepting and blocking a large portion of the light beam directed through the barrel portion 13 from the light source 14.

Reference is now made to FIGURE 3 wherein the details of the mask 15 are illustrated. The mask 15 may be of any construction for mounting within the barrel portion 13, it being only essential that the mask 15 be provided with a plurality of line type slits 16 defining the desired pattern of light beams.

As is best shown in FIGURE 1, the light source unit 5 is disposed above the glassware 7 and the beams of light emitting therefrom are directed downwardly at an angle and strike the rim portion 8 of the glassware 7 on the inner surface thereof. It is to be noted that the light beams passing through the mask 15 define a light pattern 17 on the rim portion 8 of the glassware 7. As the rim portion 8 is rotated, any minor defect, or for that fact, any larger defect, of the rim portion 8 passing into the path of the light beam defining the pattern 17 will reflect light rays from the beam of light.

The pickup head 6 is disposed to one side and below the plane of the rim portion 8. The pickup head 6 is so positioned that the axis of reflected rays from the center of the pattern 17 to the pickup head 6 is disposed substantially at right angles to the axis of light rays from the light source unit 11 to the center of the pattern 17. While the angle between the axis of the light rays passing from the light source unit 11 to the center of the pattern 17 with respect to the horizontal will be between 15° and 20°, the axis of the reflected light rays from the center of the pattern 17 to the pickup head 6 will be below the horizontal at an angle varying from 0° to 20°. This is best shown in the diagrammatic illustration of FIGURE 2.

It is to be understood that the light pattern should be varied depending upon the nature of the article of glassware being inspected and upon the type of defects to be detected. A few of the many other light patterns which may be utilized in lieu of the light pattern 17 are illustrated in FIGURES 4, 5 and 6, and referred to by the numerals 18, 19 and 20. No attempt will be made here to correlate the light patterns with the glassware surface or type of defects for which they are best suited.

The output of a photoelectric cell inspection unit may be used for many purposes. The control circuit of the photoelectric cell unit may be of such a nature as to energize a memory device, a pick-off device to remove defective glassware, or may be so simple as to operate a visual indicator. Many types of electronic systems have been devised for use in conjunction with photoelectric cell inspection units for glassware. The present invention does not contemplate the use of any particular one of these many circuits, the invention being limited to the provision of a novel light source unit. The pickup head 6 may be a part of any conventional photoelectric cell system, and for this reason, further description of the photoelectric cell circuit of which the pickup head 6 is a part, is believed to be unnecessary.

It is believed that the numerous advantages of a light source unit having a single light source which will direct a multiple line light pattern onto the area of an article of glassware being tested will be obvious to those skilled in the art. Accordingly, no detailed discussion of the merits of the light source unit, other than those set forth above, is believed to be necessary.

While one form of the invention has been shown for purposes of illustration, it is to be clearly understood that various changes in the details of construction and arrangement of parts may be made without departing from the spirit and scope of the invention as defined in the appended claims.

I claim:

1. An apparatus for the photo-electric detection of glassware defects including a light source unit for directing rays onto the glassware surface to be inspected, and a pick-up head for a photo-electric cell unit, said pickup head being fixed relative to said light source unit and out of the direct path of the light rays; the improvement residing in the construction of said light source unit which comprises a single light source, and a mask in the path of light rays from said light source, said mask having narrow slit-type light passages for the passage of light rays therethrough, the light passages and the light rays emitted therethrough being the form of at least three narrow lines intersecting at a common point.

2. An apparatus for the photo-electric detection of glassware defects including a light source unit for directing rays onto the glassware surface to be inspected, and a pick-up head for a photo-electric cell unit, said pickup head being fixed relative to said light source unit and out of the direct path of the light rays; the improvement residing in the construction of said light source unit which comprises a single light source, and a mask in the path of light rays from said light source, said mask having narrow slit-type light passages for the passage of light rays therethrough, the light passages and the light rays emitted therethrough being in the form of at least three narrow lines intersecting at a common point, and having a plurality of further light passages and resultant light rays parallel to one another and intersecting each of said common intersecting light passages and resultant light rays.

3. An apparatus for the photo-electric detection of glassware defects including a light source unit for directing rays onto the glassware surface to be inspected, and a pick-up head being fixed relative to said light source unit and out of the direct path of the light rays; the improvement residing in the construction of said light source unit which comprises a single light source, and a mask in the path of light rays from said light source, said mask having narrow slit-type light passages for the passage of light rays therethrough, the light passages and the light rays emitted therethrough being in the form of at least three parallel narrow lines and two further narrow line type light passages and resultant light rays superposed and intersecting each of said three first mentioned light passages and resultant light rays.

References Cited in the file of this patent

UNITED STATES PATENTS

| | | |
|---|---|---|
| 2,253,581 | Reynolds | Aug. 26, 1941 |
| 2,391,473 | Mullen | Dec. 25, 1945 |
| 2,406,299 | Koulicovich | Aug. 20, 1946 |
| 2,426,355 | Kellogg | Aug. 26, 1947 |
| 2,446,628 | Brown | Aug. 10, 1948 |
| 2,524,929 | Razek | Oct. 10, 1950 |
| 2,816,474 | Powell | Dec. 17, 1957 |
| 2,902,151 | Miles et al. | Sept. 1, 1959 |